(12) United States Patent
Saito et al.

(10) Patent No.: US 11,060,604 B2
(45) Date of Patent: Jul. 13, 2021

(54) LUBRICATION SYSTEM FOR POWER TRANSMISSION UNIT

(71) Applicant: TOYOTA JIDOSHA KABUSHIKI KAISHA, Toyota (JP)

(72) Inventors: Tatsuya Saito, Gotemba (JP); Yohei Habata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/674,118

(22) Filed: Nov. 5, 2019

(65) Prior Publication Data

US 2020/0158186 A1 May 21, 2020

(30) Foreign Application Priority Data

Nov. 21, 2018 (JP) .............................. JP2018-217833

(51) Int. Cl.
| | |
|---|---|
| *F16H 57/04* | (2010.01) |
| *F16D 13/74* | (2006.01) |
| *F16D 48/02* | (2006.01) |
| *F16D 25/12* | (2006.01) |

(52) U.S. Cl.
CPC ......... *F16H 57/0473* (2013.01); *F16D 13/74* (2013.01); *F16D 48/02* (2013.01); *F16D 25/123* (2013.01); *F16D 2300/06* (2013.01); *F16D 2500/70448* (2013.01)

(58) Field of Classification Search
CPC .. F16H 57/04; F16H 57/0435; F16H 57/0473; F16H 61/14; F16H 61/142; F16D 2300/06; F16D 13/74; F16D 25/123; F16D 25/0638; F16D 48/02; F16D 2048/0272; F16D 2500/70448
See application file for complete search history.

(56) References Cited

U.S. PATENT DOCUMENTS

| | | | |
|---|---|---|---|
| 2002/0033314 A1 | 3/2002 | Kato | |
| 2014/0083811 A1* | 3/2014 | Ito | F16D 25/14 192/85.63 |
| 2014/0326105 A1* | 11/2014 | Kasuya | B60K 6/387 74/661 |
| 2017/0059032 A1* | 3/2017 | Son | F16H 57/0435 |
| 2017/0259825 A1* | 9/2017 | Okada | B60W 10/02 |

FOREIGN PATENT DOCUMENTS

JP          2002-098171 A       4/2002

* cited by examiner

*Primary Examiner* — Charles A Fox
*Assistant Examiner* — Lori Wu
(74) *Attorney, Agent, or Firm* — Oblon, McClelland, Maier & Neustadt, L.L.P.

(57) ABSTRACT

A lubrication system for a power transmission unit that supplies oil to a starting clutch in an appropriate amount irrespective of an engagement state of the starting clutch. When the friction clutch is completely engaged or disengaged, a first control valve is brought into a low inflow rate mode, and the second control valve is brought into a low outflow rate mode. When the friction clutch is engaged while causing a slip the first control valve is brought into a high inflow rate mode, and the second control valve is brought a high outflow rate mode.

8 Claims, 6 Drawing Sheets

Fig. 6B

LUBRICATION SYSTEM FOR POWER TRANSMISSION UNIT

CROSS REFERENCE TO RELATED APPLICATIONS

The present disclosure claims the benefit of priority to Japanese Patent Application No. 2018-217833 filed on Nov. 21, 2018 with the Japanese Patent Office, the entire contents of which are incorporated herein by reference in its entirety.

BACKGROUND

Field of the Disclosure

Embodiments of the disclosure relate to the art of a lubrication system to supply an oil to a power transmission unit of a vehicle having a wet-type friction clutch used to launch the vehicle.

Discussion of the Related Art

In conventional vehicles having an automatic transmission to transmit power of an engine to drive wheels, a torque converter has been used to launch the vehicle. Instead, in recent years, a friction clutch has also been used to launch the vehicle quickly and to improve power transmission efficiency. US 2002/0033314 discloses one example of a lubrication control apparatus for the starting clutch of this kind. The lubrication control apparatus taught by US 2002/0033314 comprises: oil supplying means for supplying lubricating oil to the start clutch; and oil returning means for returning the lubricating oil from the start clutch to the automatic transmission. According to the teachings of US 2002/0033314, the oil supplying means supplies a necessary minimum supply quantity of the lubricating oil to the start clutch when the start clutch is put in one of a completely engaged state and a disengaged state. Whereas, when the start clutch is put in a slipping connect state, quantity varying means varies the supply quantity of the lubricating oil. Specifically, the quantity varying means increases the supply quantity of the lubricating oil with an increase in a relative slip angular speed of the start clutch in the slipping connect state.

In the lubrication control apparatus described in US 2002/0033314, a hydraulic circuit for supplying the oil from a hydraulic source to the start clutch and a hydraulic circuit for supplying the oil from the hydraulic source to the automatic transmission are formed in parallel to each other. That is, when the start clutch is in a partial engagement while causing a slip, a large amount of the oil is supplied preferentially to the start clutch. However, since a total amount of the oil circulating within those circuits is constant, the oil may not be supplied sufficiently to the other elements such as the automatic transmission, if the oil is supplied preferentially to the start clutch.

SUMMARY

Aspects of embodiments of the present disclosure have been conceived noting the foregoing technical problems, and it is therefore an object of the present disclosure to provide a lubrication system for a power transmission unit that supplies oil to a starting clutch in an appropriate amount irrespective of an engagement state of the starting clutch.

According to the exemplary embodiment of the present disclosure, there is provided a lubrication system for a power transmission unit that cools and lubricates a wet-type friction clutch and a lubrication site of the power transmission unit by oil. In order to achieve the above-explained objective, according to the exemplary embodiment of the present disclosure, the lubrication system is provided with: a first control valve that controls a flow rate of the oil delivered from the oil pan to the friction clutch; a first oil passage that delivers the oil to the friction clutch at a flow rate regulated by the first control valve; a second oil passage that allows the oil to be discharged from the friction clutch after lubricating and cooling the friction clutch; a second control valve that controls a flow rate of the oil discharged from the friction clutch through the second oil passage; a third oil passage that delivers the oil flowing from the friction clutch through the second oil passage to the lubrication site; a fourth oil passage that discharges the oil to the oil pan at a flow rate regulated by the second control valve; and a controller that controls at least the first control valve and the second control valve. Specifically, the controller is configured to: bring the first control valve into a low inflow rate mode in which the oil flows into the friction clutch at a low rate, and bring the second control valve into a low outflow rate mode in which the oil is discharged to the oil pan at a low rate or not discharged to the oil pan, when the friction clutch is completely engaged or disengaged; and bring the first control valve into a high inflow rate mode in which the oil flows into the friction clutch at a high rate that is higher than the rate in the low inflow rate mode, and bring the second control valve into a high outflow rate mode in which the oil is discharged to the oil pan at a high rate that is higher than the rate in the low outflow rate mode, when the friction clutch is engaged while causing a slip.

In a non-limiting embodiment, the friction clutch may comprise an inlet that allows the oil delivered from the first control valve to flow into the friction clutch, and an outlet that allows the oil to be discharged from the friction clutch. The friction clutch may be maintained in an oil-sealed condition in which an inflow of the oil to the friction clutch through the inlet is substantially equal to an outflow of the oil from the friction clutch through the outlet.

In a non-limiting embodiment, the lubrication system may further comprise a hydraulic circuit. The hydraulic circuit may include a low flow rate passage in which a flow rate of the oil flowing from the oil pan to the first control valve therethrough is regulated to the low rate, and a high flow rate passage in which a flow rate of the oil flowing from the oil pan to the first control valve therethrough is regulated to the high rate. The first control valve may include a changeover valve that is selectively switched between the low inflow rate mode to connect the low flow rate passage to the first oil passage, and the high inflow rate mode to connect the high flow rate passage to the first oil passage. The second control valve may include a changeover valve that is selectively switched between the low outflow rate mode to connect the second oil passage to the third oil passage, and the high outflow rate mode to connect the second oil passage to both of the third oil passage and the fourth oil passage. The controller may be further configured to: bring the first control valve into the low inflow rate mode and the second control valve into the low outflow rate mode when the friction clutch is completely engaged or disengaged; and bring the first control valve into the high inflow rate mode and the second control valve into the high outflow rate mode when the friction clutch is engaged while causing a slip.

In a non-limiting embodiment, the lubrication system may further comprise a solenoid valve that is turned off to bring the first control valve into the low inflow rate mode and the second control valve into the low outflow rate mode, and that is turned on to bring the first control valve into the high inflow rate mode and the second control valve into the high outflow rate mode. The controller may be further configured to: turn off the solenoid valve when the friction clutch is completely engaged or disengaged; and turn on the solenoid valve when the friction clutch is engaged while causing a slip.

In a non-limiting embodiment, the lubrication system may further comprise a third control valve that is formed by integrating the first control valve with the second control valve. The third control valve may include a changeover valve that is selectively switched between a low flow rate mode to connect the low flow rate passage to the first oil passage and to connect the second oil passage to the third oil passage, and a high flow rate mode to connect the high flow rate passage to the first oil passage and to connect the second oil passage to both of the third oil passage and the fourth oil passage. The controller may be further configured to: bring the third control valve into the low flow rate mode when the friction clutch is completely engaged or disengaged; and bring the third control valve into the high flow rate mode when the friction clutch is engaged while causing a slip.

In the lubrication system according to the embodiment of the present disclosure, the oil in the oil pan is delivered to the friction clutch, and after cooling and lubricating the friction clutch, the oil is further delivered to another lubrication site. Specifically, in the hydraulic circuit, between the oil pan and the friction clutch, a circuit for delivering the oil to the friction clutch and a circuit for delivering the oil to the lubrication site are formed in series. A flow rate of the oil delivered to the friction clutch is regulated by the first control valve depending on an engagement state of the friction clutch. For example, when the friction clutch in completely engaged or disengaged, the oil is delivered to the friction clutch at the low rate. By contrast, when the friction clutch is engaged while causing a slip, the oil is delivered to the friction clutch at the high rate. After cooling and lubricating the friction clutch, the oil is further delivered to the lubrication site through the third oil passage and drained to the oil pan through the fourth oil passage. A flow rate of the oil discharged to the oil pan is regulated by the second control valve depending on the engagement state of the friction clutch. For example, when the friction clutch in completely engaged or disengaged, the oil is discharged to the oil pan at the low rate, or not discharged to the oil pan. By contrast, when the friction clutch is engaged while causing a slip, the oil is discharged to the oil pan at the high rate.

According to the embodiment of the present disclosure, therefore, the oil can be supplied to the friction clutch in an appropriate amount irrespective of the engagement state of the friction clutch. In addition, the oil can be supplied to the lubrication site at a constant rate irrespective of the engagement state of the friction clutch. For these reasons, in the power transmission unit to which the lubrication system is applied, the oil can be supplied to the friction clutch as well as the lubrication site irrespective of the engagement state of the friction clutch.

In the power transmission unit to which the lubrication system is applied, the friction clutch is maintained in the oil-sealed condition. In the hydraulic circuit of the lubrication system, therefore, the inflow of the oil to the friction clutch and the outflow of the oil from the friction clutch may be balanced to each other.

According to the embodiment of the present disclosure, the changeover valve is adopted as the first control valve and the second first control valve, respectively. The first control valve is selectively switched between the low inflow rate mode to connect the low flow rate passage to the first oil passage, and the high inflow rate mode to connect the high flow rate passage to the first oil passage. On the other hand, the second control valve is selectively switched between the low outflow rate mode to connect the second oil passage to the third oil passage, and the high outflow rate mode to connect the second oil passage to both of the third oil passage and the fourth oil passage. According to the embodiment of the present disclosure, therefore, the flow rate of the oil delivered to the friction clutch and the flow rate of the oil discharged to the oil pan may be controlled easily.

According to the embodiment of the present disclosure, the first control valve and the second control valve are actuated integrally by the common solenoid valve. According to the embodiment of the present disclosure, therefore, the first control valve and the second control valve may be controlled easily by controlling the solenoid valve to adjust the flow rate of the oil flowing through the hydraulic circuit.

In addition, the first control valve and the second control valve may be integrated to serve as the third control valve. The third control valve is selectively switched between the low flow rate mode to connect the low flow rate passage to the first oil passage and to connect the second oil passage to the third oil passage, and the high flow rate mode to connect the high flow rate passage to the first oil passage and to connect the second oil passage to both of the third oil passage and the fourth oil passage. In a case of employing the third control valve to regulate the flow rate of the oil flowing through the hydraulic circuit, number of the control valves can be reduced. In this case, therefore, a manufacturing cost of the lubrication system may be reduced and the lubrication system may be downsized.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIGS. 4A and 4B are partial circuit diagrams of the lubrication system shown in FIG. 3 in which FIG. 4A shows a situation in which the first control valve is in the low inflow rate mode and the second control valve is in the low outflow rate mode.

DETAILED DESCRIPTION OF THE PREFERRED EMBODIMENT(S)

Preferred embodiments of the present disclosure will now be explained with reference to the accompanying drawings.

Figure 1:
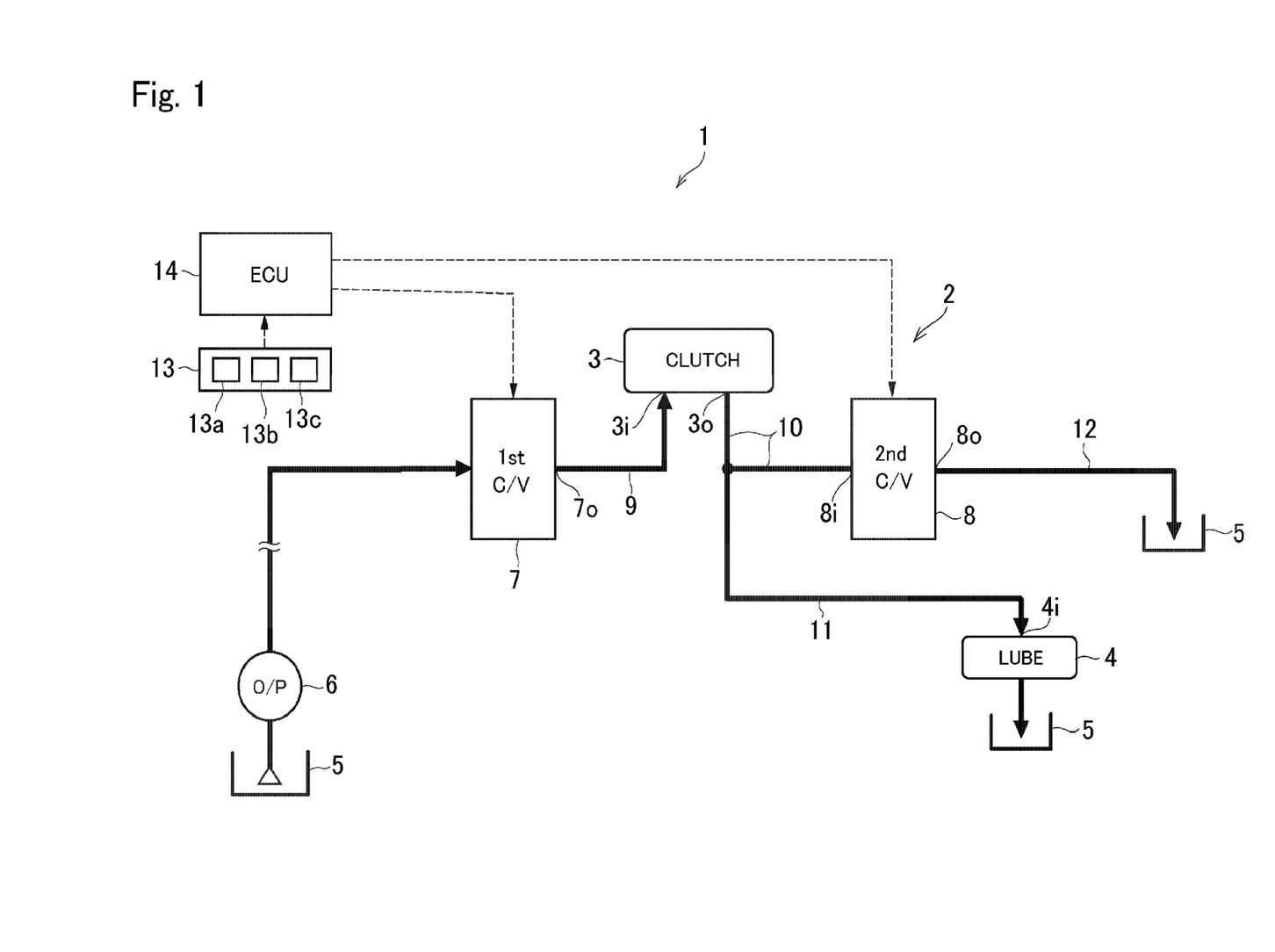
FIG. 1 is a schematic illustration showing structures of a hydraulic system and a control system of the lubrication system according to the embodiment of the present disclosure.

Turning now to FIG. 1, there is schematically shown one example of a fundamental structure of the lubrication system 1 according to the exemplary embodiment of the present disclosure. For example, the lubrication system 1 may be applied to a power transmission unit 2 of a vehicle that is powered by an engine to supply oil to the power transmission unit 2. To this end, the lubrication system 1 is provided with an oil pump (referred to as O/P in the drawings) 6, a first control valve (referred to as 1st·C/V in the drawings) 7, a second control valve (referred to as 2nd·C/V in the drawings) 8, a first oil passage 9, a second oil passage 10, a third oil passage 11, a fourth oil passage 12, a detector 13, a controller (referred to as ECU in the drawings) 14, and so on.

The power transmission unit 2 transmits a torque generated by a prime mover to an output member such as a driveshaft (neither of which are shown). According to the exemplary embodiment, a transaxle comprising an automatic transmission and a motor serving as a prime mover (neither of which are shown) may also be adopted as the power transmission unit 2. The power transmission unit 2 comprises a starting clutch 3, a lubrication site (referred to as LUBE in the drawings) 4, and an oil pan 5.

A torque of the prime mover is applied to the starting clutch 3 to launch the vehicle. When launching the vehicle, engagement elements of the starting clutch 3 are engaged while causing a slip to vary a torque transmitting capacity continuously. For this application, a wet-type friction clutch is adopted as the starting clutch 3, and the starting clutch 3 is lubricated and cooled by oil. Preferably, the starting clutch 3 is maintained in an oil-sealed condition in which an inflow of the oil to the starting clutch 3 is equal to an outflow of the oil from the starting clutch 3.

Figure 2:
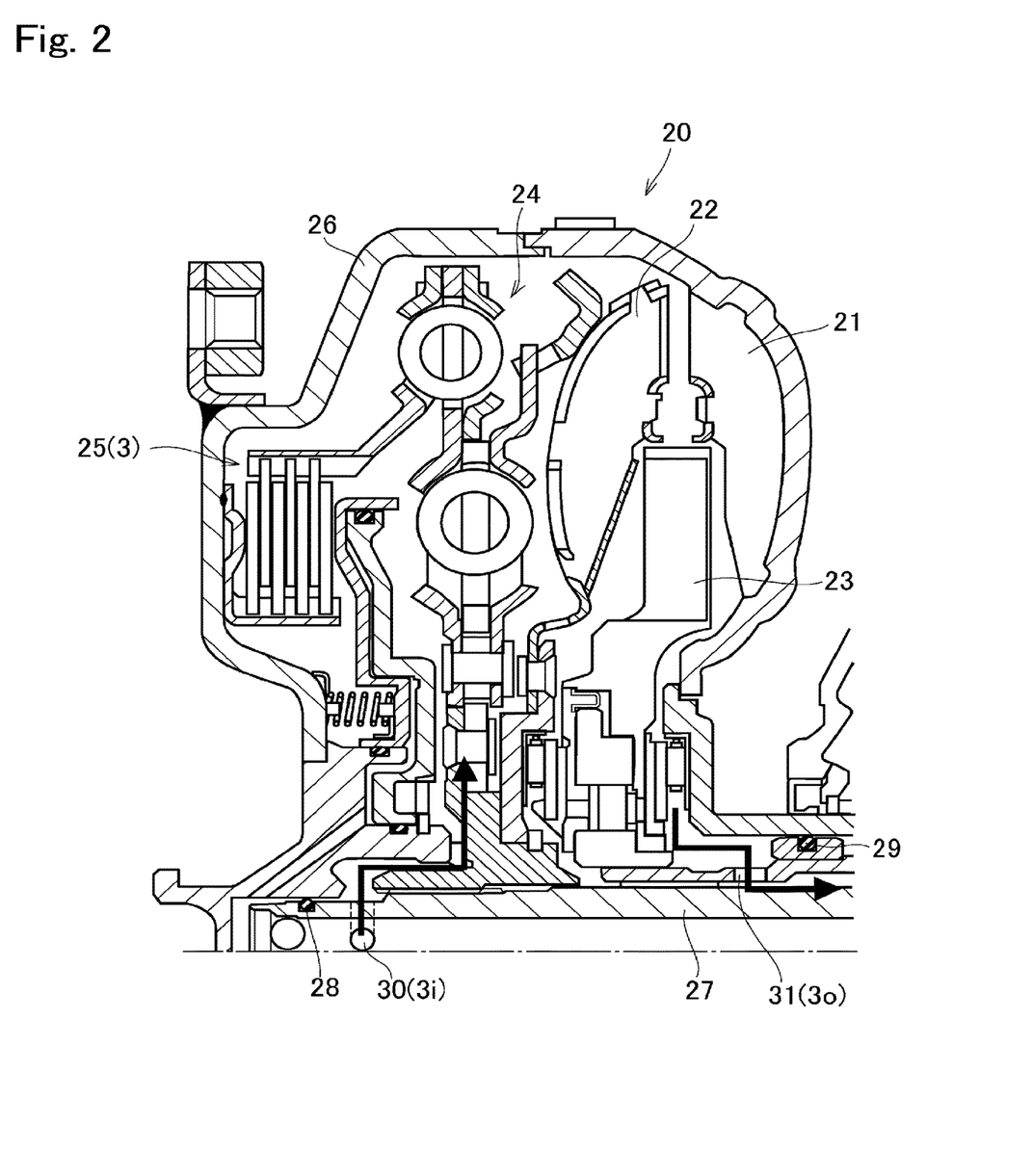
FIG. 2 is a cross-sectional view showing a cross-section of a starting clutch arranged in a torque converter to which the lubrication system according to the embodiment of the present disclosure is applied.

An example of a structure of the starting clutch 3 is shown in FIG. 2. As illustrated in FIG. 2, a lockup clutch 25 as a wet-type multiple plate friction clutch is arranged in a torque converter 20 to serve as the starting clutch 3. A pump impeller 21, a turbine runner 22, a stator 23, a damper 24 that absorbs pulsation of a torque of an engine (not shown), and the lockup clutch 25 that connects an input member to an output member of the torque converter 20, are held in a case 26 of the torque converter 20. In order to maintain a liquid-tight condition in the case 26, seal rings 28 and 29 are interposed between an output shaft 27 (or an input shaft of the power transmission unit 2) and the case 26. The oil is allowed to flow into the torque converter 20 from an inlet 30 formed on the output shaft 27 so that the case 26 holding the lockup clutch 25 is filled with the oil. The oil is discharged from an outlet 31 to be delivered to the lubrication site 4 such as the automatic transmission.

Thus, the case 26 in which the lockup clutch 25 is arranged is maintained in a liquid-tight condition, and an inflow of the oil to the case 26 through the inlet 30 is substantially equal to an outflow of the oil from the case 26 through the outlet 30. According to the embodiment of the present disclosure, the lockup clutch 25 thus has been described may be adopted as the starting clutch 3 in the power transmission unit 2. Instead of the lockup clutch 25 arranged in the torque converter 20, a friction clutch covered with an oil-sealed cover may also be adopted as the starting clutch 3.

The lubrication site 4 includes all of the elements and parts of the power transmission unit 2 to be cooled and lubricated by the oil, other than the starting clutch 3. For example, gears and bearings (neither of which are shown) arranged in the power transmission unit 2 corresponds to the lubrication site 4. Given that the lubrication system 1 is applied to the above-mentioned transaxle combined with a motor, the lubrication site 4 includes the motor.

Turning back to FIG. 1, the oil pan 5 is formed on a bottom of the power transmission unit 2 to receive the oil. The oil delivered to the lubrication site 4 drips gravitationally from the lubrication site 4 to the oil pan, and pumped up from the oil pan 5 by the oil pump 6. Then, a pressure and a flow rate of the oil is regulated in a predetermined hydraulic circuit and delivered to the first control valve 7.

The first control valve 7 regulates a flow rate of the oil delivered from the oil pan 5 to the starting clutch 3 through the first oil passage 9. Specifically, when the starting clutch 3 is engaged while causing a slip, the first control valve 7 increases the flow rate of the oil flowing through the first oil passage 9 as compared to the flow rate of the oil flowing through the first oil passage 9 when the starting clutch 3 is completely engaged or disengaged. To this end, for example, a variable throttle valve, a flow regulating valve, an on/off valve, a changeover valve and so on may be adopted as the first control valve 7. In the below-explained example shown in FIG. 3, a changeover valve is used as the first control valve 7, and the first control valve 7 is controlled by a controller 14 to switch a flow rate of the oil delivered to the starting clutch 3 selectively between a high flow rate and a low flow rate. Specifically, the first control valve 7 may vary the flow rate of the oil delivered to the starting clutch 3 continuously or stepwise between the high flow rate and the low flow rate.

The second control valve 8 regulates a flow rate of the oil discharged from the starting clutch 3 through the second oil passage 10. Specifically, when the starting clutch 3 is engaged while causing a slip, the second control valve 8 equalizes a flow rate of the oil flowing through the third oil passage 11 to the flow rate of the oil flowing through the third oil passage 11 when the starting clutch 3 is completely engaged or disengaged. In the lubrication system 1, therefore, the flow rate of the oil delivered to the lubrication site 4 through the third oil passage 11 is maintained to a constant rate, irrespective of the engagement state of the starting clutch 3. To this end, for example, a variable throttle valve, a flow regulating valve, an on/off valve, a changeover valve and so on may also be adopted as the second control valve 8. In the below-explained example shown in FIG. 3, a changeover valve is also used as the second control valve 8. The second control valve 8 is controlled by the controller 14 to selectively discharge the oil directly to the oil pan 5 at a high flow rate, and not to discharge the oil to the oil pan 5. Instead, the second control valve 8 may also be adapted to selectively switch a flow rate of the oil discharged directly to the oil pan 5 between a high rate and a low rate. Specifically, the second control valve 8 may vary the flow rate of the oil discharged to the oil pan 5 continuously or stepwise between the high flow rate and zero.

The first oil passage 9 connects an outlet 7o of the first control valve 7 to an inlet 3i of the starting clutch 3 so that the oil is allowed to flow into the starting clutch 3 at a rate regulated by the first control valve 7. Given that the aforementioned lockup clutch 25 is employed as the starting clutch 3, the first oil passage 9 connects the outlet 7o of the first control valve 7 to the inlet 30 of the torque converter 20.

Thus, according to the embodiment of the present disclosure, the inlet 30 shown in FIG. 2 serves as the inlet 3i of the starting clutch 3.

The second oil passage 10 connects an outlet 3o of the starting clutch 3 to an inlet 8i of the second control valve 8 so that the oil is allowed to be discharged from the starting clutch 3 after lubricating and cooling the starting clutch 3. Given that the aforementioned lockup clutch 25 is employed as the starting clutch 3, the second oil passage 10 connects the outlet 31 of the torque converter 20 to the inlet 8i of the second control valve 8. Optionally, in order to suppress a temperature rise in the oil caused as a result of lubricating and cooling the starting clutch 3, an oil cooler (not shown) may be arranged downstream of the outlet 3o of the starting clutch 3. For example, the oil cooler may be arranged on the second oil passage 10 to supply the oil cooled by the oil cooler to the lubrication site 4 and to discharge the oil cooled by the oil cooler to the oil pan 5.

The third oil passage 11 connects the outlet 3o of the starting clutch 3 to an inlet 4i of the lubrication site 4 so that the oil is allowed to be supplied to the lubrication site 4 from the starting clutch 3. Given that the aforementioned lockup clutch 25 is employed as the starting clutch 3, the third oil passage 11 connects the outlet 31 of the torque converter 20 to the inlet 4i of the lubrication site 4. Thus, according to the embodiment of the present disclosure, the outlet 31 shown in FIG. 2 serves as the outlet 3o of the starting clutch 3. Here, as illustrated in FIG. 1, a part of the third oil passage 11 in the vicinity of the outlet 3o of the starting clutch 3 may also serve as the second oil passage 10.

The fourth oil passage 12 connects the opening 8o of the second control valve 8 to the oil pan 5 so that the oil is discharged directly to the oil pan 5 from above at a rate regulated by the second control valve 8.

The detector 13 collects data for controlling the first control valve 7 and the second control valve 8. To this end, the detector 13 comprises a pressure sensor 13a that detects a piston pressure of an actuator (not shown) to actuate the starting clutch 3, and a speed sensor 13b that detects an input speed and an output speed of the starting clutch 3. As explained later, in the example shown in FIG. 3, a solenoid valve 44 is employed to integrally control the first control valve 7 and the second control valve 8. In the example shown in FIG. 3, therefore, the detector 13 further comprises a current sensor 13c that detects a current value applied to the solenoid valve 44. The detector 13 is electrically connected with the controller 14 so that the data collected by the detector 13 or a detection value calculated by the detector 13 is transmitted to the controller 14 in the form of electric signal.

The controller 14 is an electronic control unit having a microcomputer as its main component. The controller 14 performs a calculation based on the incident data as well as data and formulas installed in advance, and transmit a calculation result in the form of command signal to control the first control valve 7 and the second control valve 8. In the example shown in FIG. 3, the first control valve 7 and the second control valve 8 are controlled indirectly by controlling the solenoid valve 44 by the controller 14.

Figure 3:
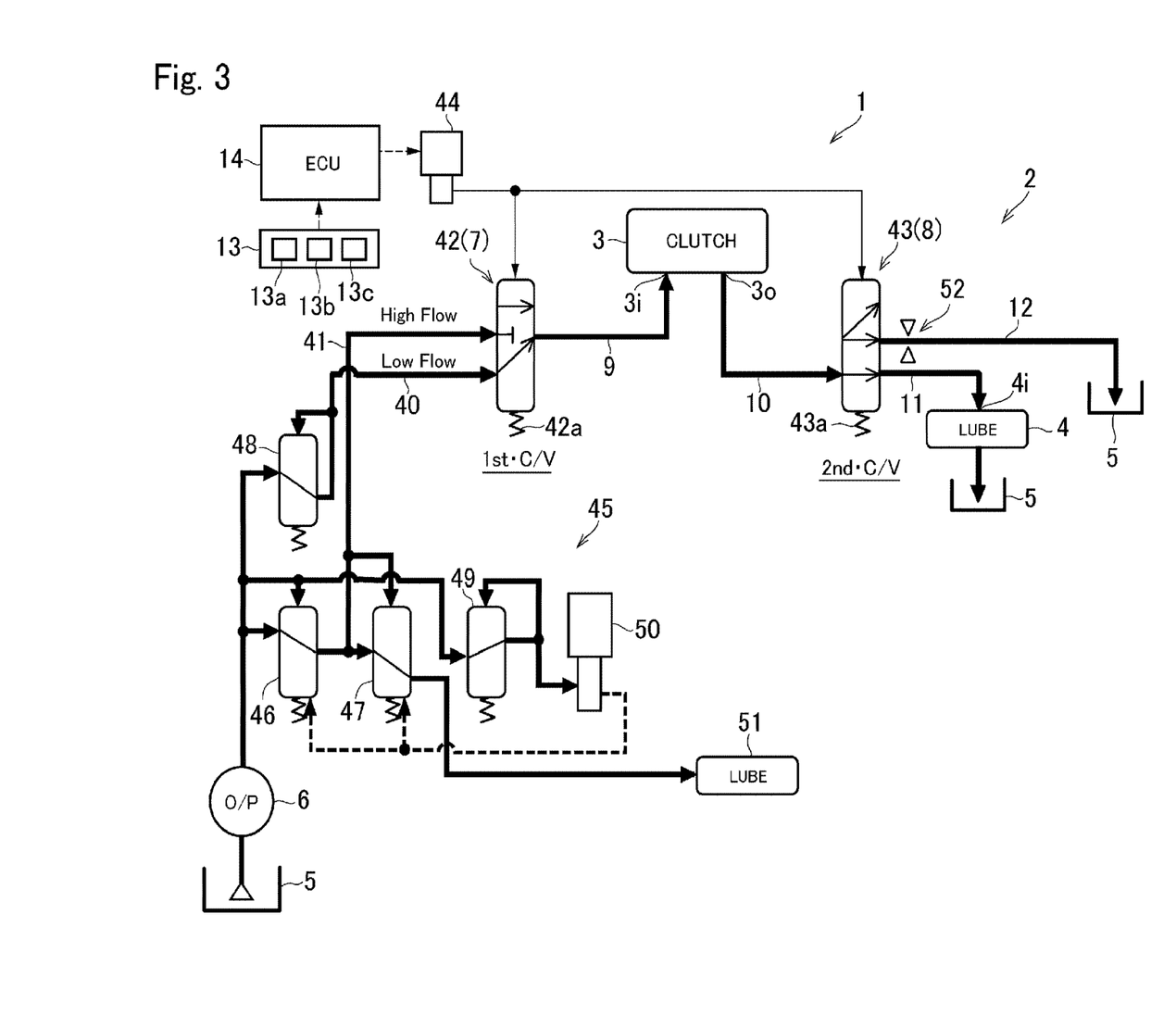
FIG. 3 is a circuit diagram showing one example of a structure of the lubrication system according to the embodiment of the present disclosure in detail.
Figure 4A:
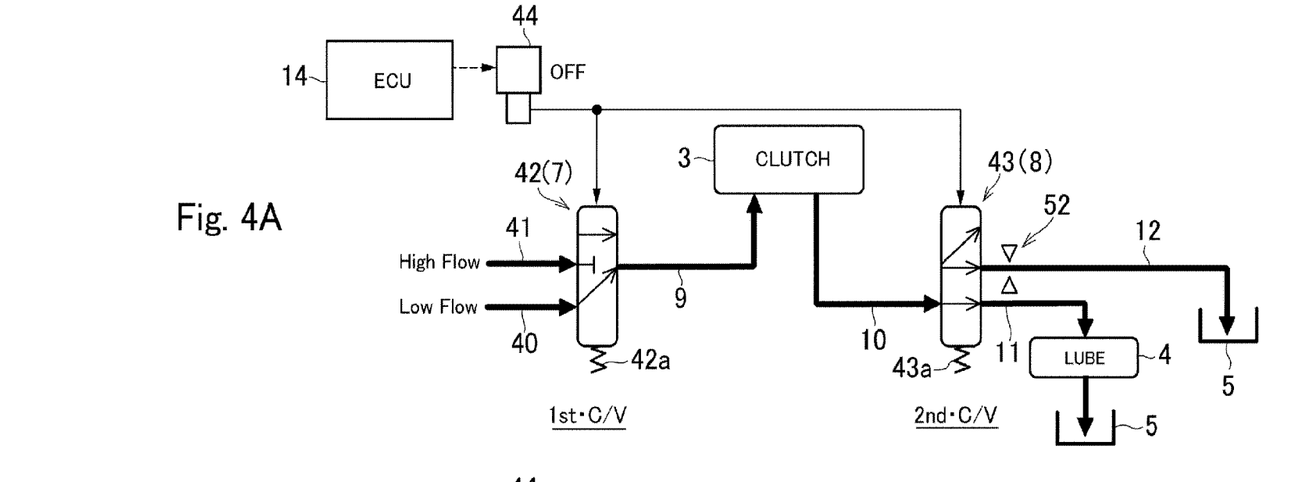
Figure 4B:
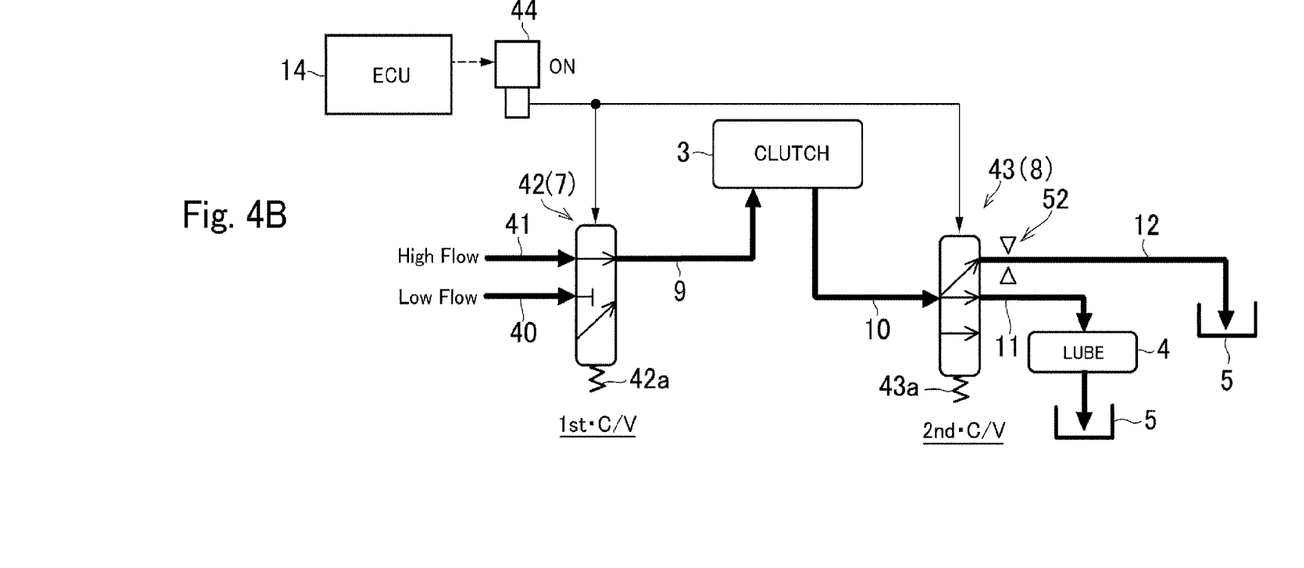
FIG. 4B shows a situation in which the first control valve is in the high inflow rate mode and the second control valve is in the high outflow rate mode.

A structure of the lubrication system 1 according to the embodiment of the present disclosure is shown in FIGS. 3, 4A and 4B in more detail. In FIGS. 3, 4A and 4B, common reference numerals are allotted to the elements in common with those in FIG. 1.

In the lubrication system 1 shown in FIG. 3, a first changeover valve 42 serves as the first control valve 7. The first changeover valve 42 is selectively switched between a low inflow rate mode in which a low flow rate passage 40 is connected to the first oil passage 9, and a high inflow rate mode in which a high flow rate passage 41 is connected to the first oil passage 9. That is, when the low flow rate passage 40 is connected to the first oil passage 9 through the first changeover valve 42, the oil flows into the first oil passage 9 at a low flow rate. By contrast, when the high flow rate passage 41 is connected to the first oil passage 9 through the first changeover valve 42, the oil flows into the first oil passage 9 at a high flow rate. On the other hand, a second changeover valve 43 serves as the second control valve 8. The second changeover valve 43 is selectively switched between a low outflow rate mode to connect the second oil passage 10 to the third oil passage 11, and a high outflow mode to connect the second oil passage 10 to both of the third oil passage 11 and the fourth oil passage 12. That is, when the second oil passage 10 is connected to the third oil passage 11 through the second changeover valve 43, the oil is discharged from the second changeover valve 43 at a low flow rate. By contrast, when the second oil passage 10 is connected to both of the third oil passage 11 and the fourth oil passage 12, the oil is discharged from the second changeover valve 43 at a high flow rate. The first changeover valve 42 serving as the first control valve 7, and the second changeover valve 43 serving as the second control valve 8 are controlled integrally by the solenoid valve 44.

The low flow rate passage 40 and the high flow rate passage 41 are formed in a hydraulic circuit 45 formed upstream of the first changeover valve 42. In the hydraulic circuit 45 the oil in the oil pan 5 is pumped up by the oil pump 6 while being pressurized, and delivered to the first changeover valve 42 at the low flow rate or the high flow rate.

According to the example shown in FIG. 3, the hydraulic circuit 45 comprises the oil pump 6, a primary regulator valve 46, a secondary regulator valve 47, a modulator valve 48, a modulator valve 49, a linear solenoid valve 50, the low flow rate passage 40, and the high flow rate passage 41.

The primary regulator valve 46 establishes a line pressure by regulating a hydraulic pressure generated by the oil pump 6, and the oil is delivered to the high flow rate passage 41 under the line pressure regulated by the primary regulator valve 46. The oil flows through the high flow rate passage 41 at the high flow rate and then flows into the first changeover valve 42. Specifically, the oil is delivered to the first changeover valve 42 at the high flow rate when the starting clutch 3 is engaged while causing a slip. To this end, the high flow rate is set in such a manner as to deliver at least a minimal amount of the oil required by the starting clutch 3 engaged while causing a slip is delivered to the starting clutch 3. That is, the line pressure in the hydraulic circuit 45 is set in such a manner as to deliver at least the minimal amount of the oil required by the starting clutch 3 engaged while causing a slip is delivered to the starting clutch 3.

The line pressure regulated by the primary regulator valve 46 is further regulated to a secondary pressure by the secondary regulator valve 47. The oil regulated to the secondary pressure is delivered to a lubrication site 51 to cool and lubricate the lubrication site 51. The lubrication site 51 includes all of the elements and parts of the power transmission unit 2 to be cooled and lubricated by the oil. The lubrication site 51 may be not only different from but also identical to the aforementioned lubrication site 4. In the lubrication system 1, the secondary pressure is set in such a manner as to deliver at least a minimal amount of the oil required by the lubrication site 51 or 4 to the lubrication site 51 or 4.

The modulator valve 48 regulates the hydraulic pressure generated by the oil pump 6 to a predetermined modulator pressure, and the oil is delivered to the low flow rate passage 40 under the modulator pressure regulated by the modulator valve 48. The oil flows through the low flow rate passage 40 at the low flow rate and then flows into the first changeover valve 42. Specifically, the oil is delivered to the first changeover valve 42 at the low flow rate when the starting clutch 3 is completely engaged or disengaged, and after lubricating and cooling the starting clutch 3, the oil is further delivered to the lubrication site 4 also at the low flow rate. To this end, the low flow rate is set in such a manner as to deliver at least a minimal required amount of the oil to the starting clutch 3 completely engaged or disengaged, and to the lubrication site 4, respectively. That is, the modulator pressure in the hydraulic circuit 45 is set in such a manner as to deliver at least the minimal amount of the oil to the starting clutch 3 completely engaged or disengaged, and to the lubrication site 4, respectively.

The hydraulic pressure generated by the oil pump 6 is also regulated by the modulator valve 48 to a predetermined modulator pressure, and the oil is delivered to the linear solenoid valve 50 under the modulator pressure regulated by the modulator valve 49 so as to establish an initial pressure of a hydraulic command signal (or pressure) to be transmitted from the linear solenoid valve 50. Specifically, the linear solenoid valve 50 transmits the hydraulic command signal to the primary regulator valve 46 and the secondary regulator valve 47 to control those valves.

The solenoid valve 44 transmits a hydraulic command signal (or pressure) when turned on, and the first changeover valve 42 is actuated by the hydraulic command signal transmitted from the solenoid valve 44 to selectively switch the flow rate of the oil delivered to the starting clutch 3 between the high flow rate and the low flow rate. As shown in FIG. 4A, the first changeover valve 42 is normally brought into a low inflow rate mode to connect the low flow rate passage 40 to the first oil passage 9 by a return spring 42a (when the solenoid valve 44 is turned off). By contrast, as shown in FIG. 4B, the first changeover valve 42 is brought into a high inflow rate mode to connect the high flow rate passage 41 to the first oil passage 9 when the solenoid valve 44 is turned on.

The second changeover valve 43 is also actuated by the hydraulic command signal transmitted from the solenoid valve 44 to selectively switch the flow rate of the oil discharged to the oil pan 5 between the high flow rate and the low flow rate. As shown in FIG. 4A, the second changeover valve 43 is normally brought into a low outflow rate mode to connect the second oil passage 10 to the third oil passage 11 by a return spring 43a (when the solenoid valve 44 is turned off). By contrast, as shown in FIG. 4B, the second changeover valve 43 is brought into a high outflow rate mode to connect the second oil passage 10 to both of the third oil passage 11 and the fourth oil passage 12 when the solenoid valve 44 is turned on.

In order to regulate a flow rate of the oil flowing through the third oil passage 11 to a predetermined rate, an orifice 52 is arranged on the fourth oil passage 12. Specifically, the orifice 52 is adapted to equalize the flow rate of the oil flowing through the third oil passage 11 in both cases in which the second changeover valve 43 is in the high outflow rate mode to connect the second oil passage 10 to both of the third oil passage 11 and the fourth oil passage 12, and in which the second changeover valve 43 is in the low outflow rate mode to connect the second oil passage 10 to the third oil passage 11. That is, in the lubrication system 1, the oil is supplied to the lubrication site 4 from the third oil passage 11 at a constant rate, irrespective of engagement state of the starting clutch 3.

The solenoid valve 44 is an on/off electromagnetic valve that is turned on to output the hydraulic command signal when energized, and that is turned off by interrupting a current supply thereto. Specifically, the first changeover valve 42 is brought into the low inflow rate mode and the second changeover valve 43 is brought into the low outflow rate mode when the solenoid valve 44 is turned off by the controller 14. By contrast, the first changeover valve 42 is brought into the high inflow rate mode and the second changeover valve 43 is brought into the high outflow rate mode when the solenoid valve 44 is turned on by the controller 14.

Thus, in the lubrication system 1, the first changeover valve 42 and the second changeover valve 43 are actuated integrally by selectively supplying current to the solenoid valve 44 by the controller 14. In the lubrication system 1, therefore, the flow rates of the oil between the oil pan 5 and the starting clutch 3 and between the starting clutch 3 and the oil pan 5 may be switched easily between the high flow rate and the low flow rate by merely controlling the solenoid valve 44.

Figure 5:
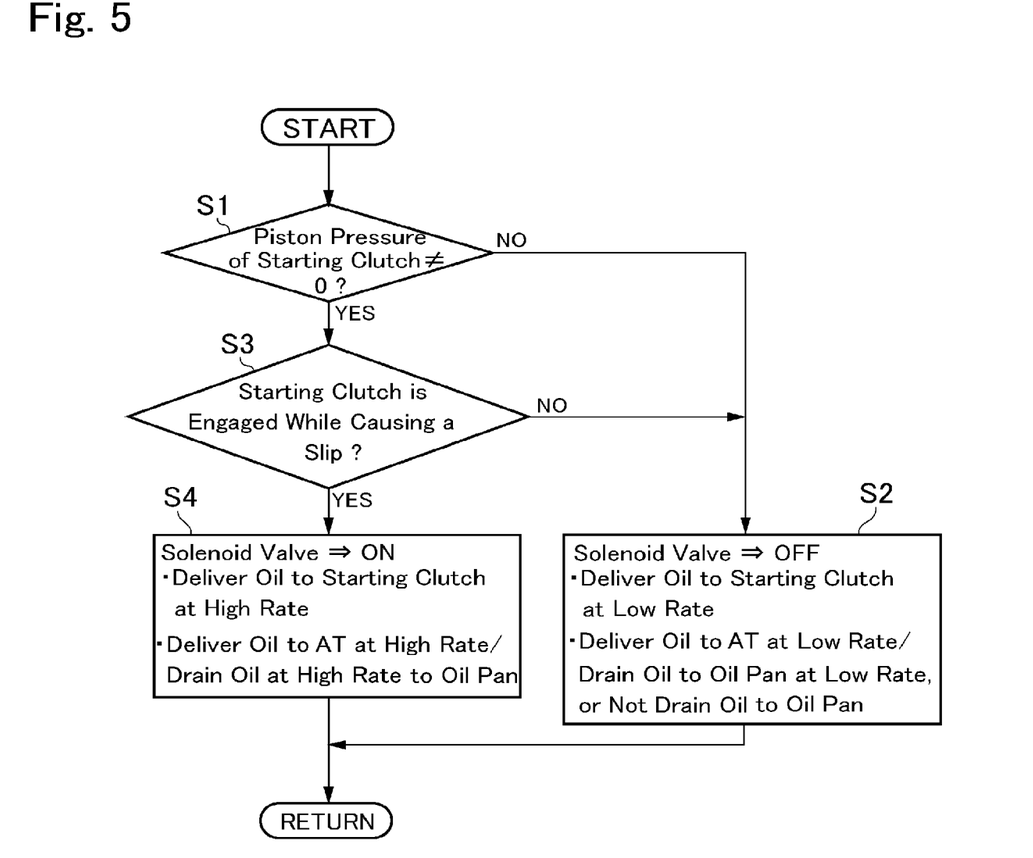
FIG. 5 is a flowchart showing one example of a routine executed by the controller to regulate the flow rate of the oil.

In order to supply the oil to the starting clutch 3 and the lubrication site 4 constantly in appropriate amounts, the controller 14 is configured to execute a routine shown in FIG. 5.

At step S1, it is determined whether the piston pressure applied to the starting clutch 3 is not zero, that is, it is determined whether the starting clutch 3 is not disengaged completely. According to the embodiment of the present disclosure, a condition in which the piston pressure applied to the starting clutch 3 is zero is defined as the complete disengagement of the starting clutch 3, and a condition in which the piston pressure applied to the starting clutch 3 is maximum or greater than a predetermined pressure is defined as the complete engagement of the starting clutch 3. Further, a condition in which the piston pressure applied to the starting clutch 3 is in between zero and the predetermined pressure so that the engagement elements of the starting clutch 3 are rotated at different speeds is defined as the slip engagement.

If the piston pressure applied to the starting clutch 3 is zero, that is, if the starting clutch 3 is disengaged completely so that the answer of step S1 is NO, the routine progresses to step S2.

At step S2, the solenoid valve 44 is turned off by stopping current supply to the solenoid valve 44 so that the first changeover valve 42 is brought into the low inflow rate mode and the second changeover valve 43 is brought into the low outflow rate mode. Consequently, the flow rate of the oil delivered to the starting clutch 3 is switched to the low flow rate, and after cooling and lubricating the starting clutch 3, the oil is further delivered to the lubrication site 4 at the low flow rate through the third oil passage 11. Given that the lubrication system 1 is applied to the hydraulic system shown in FIG. 1, the first control valve 7 is brought into the low inflow rate mode to connect the low flow rate passage 40 to the first oil passage 9, and the second control valve 8 is brought into the low outflow rate mode to disconnect the second oil passage 10 from the fourth oil passage 12. In this situation, since the second oil passage 10 is not connected to the fourth oil passage 12, the oil is not discharged directly to the oil pan 5 after cooling and lubricating the starting clutch 3. That is, the oil is discharged to the oil pan 5 after cooling and lubricating the starting clutch 3. Thereafter, the routine returns.

By contrast, if the piston pressure applied to the starting clutch 3 is not zero, that is, if the starting clutch 3 is not disengaged completely so that the answer of step S1 is YES, the routine progresses to step S3.

At step S3, it is determined whether the starting clutch 3 is engaged while causing a slip. Specifically, it is determined whether a speed difference between the engagement elements of the starting clutch 3 is greater than a predetermined threshold value set in advance.

If the speed difference between the engagement elements of the starting clutch 3 is smaller than the threshold value, that is, if the starting clutch 3 is engaged completely so that the answer of step S3 is NO, the routine also progresses to step S2 to turn off the solenoid valve 44. In this case, therefore, the first changeover valve 42 is also brought into the low inflow rate mode, and the second changeover valve 43 is also brought into the low outflow rate mode. Consequently, the flow rate of the oil delivered to the starting clutch 3 is switched to the low flow rate, and after cooling and lubricating the starting clutch 3, the oil is further delivered to the lubrication site 4 at the low flow rate through the third oil passage 11. Thereafter, the routine returns.

By contrast, if the speed difference between the engagement elements of the starting clutch 3 is greater than the threshold value, that is, if the starting clutch 3 is engaged while causing a slip so that the answer of step S3 is YES, the routine progresses to step S4.

At step S4, the solenoid valve 44 is turned on by supplying current to the solenoid valve 44 so that the first changeover valve 42 is brought into the high inflow rate mode, and the second changeover valve 43 is brought into the high outflow rate mode. Consequently, the flow rate of the oil delivered to the starting clutch 3 is switched to the high flow rate. After cooling and lubricating the starting clutch 3, a part of the oil is drained to the oil pan through the fourth oil passage 12 at the flow rate regulated by the orifice 52, and the remaining oil is further delivered to the lubrication site 4 through the third oil passage 11 at the flow rate identical to the flow rate of the case in which the starting clutch 3 is engaged or disengaged completely. That is, the oil is supplied to the lubrication site 4 always at the constant rate irrespective of the engagement state of the starting clutch 3. Given that the lubrication system 1 is applied to the hydraulic system shown in FIG. 1, the first control valve 7 is brought into the high inflow rate mode to connect the high flow rate passage 41 to the first oil passage 9, and the second control valve 8 is brought into the high outflow rate mode to connect the second oil passage 10 to both of the third oil passage 11 and the fourth oil passage 12. Thereafter, the routine returns.

Thus, the flow rate of the oil delivered to the starting clutch 3 is switched between the high flow rate and the low flow rate by controlling the first changeover valve 42 (or the first control valve 7), depending on the engagement state of the starting clutch 3. Therefore, the oil can be supplied to the starting clutch in an appropriate amount. In addition, the flow rate of the oil returned to the oil pan 5 is adjusted by controlling the second changeover valve 43 (or the second control valve 8) depending on the engagement state of the starting clutch 3. Therefore, the oil can be supplied to the lubrication site 4 always at the constant rate irrespective of the engagement state of the starting clutch 3. For these reasons, in the power transmission unit 2, the oil can be supplied always in an appropriate amount not only to the starting clutch 3 but also to the lubrication site 4 irrespective of the engagement state of the starting clutch 3.

Figure 6A:
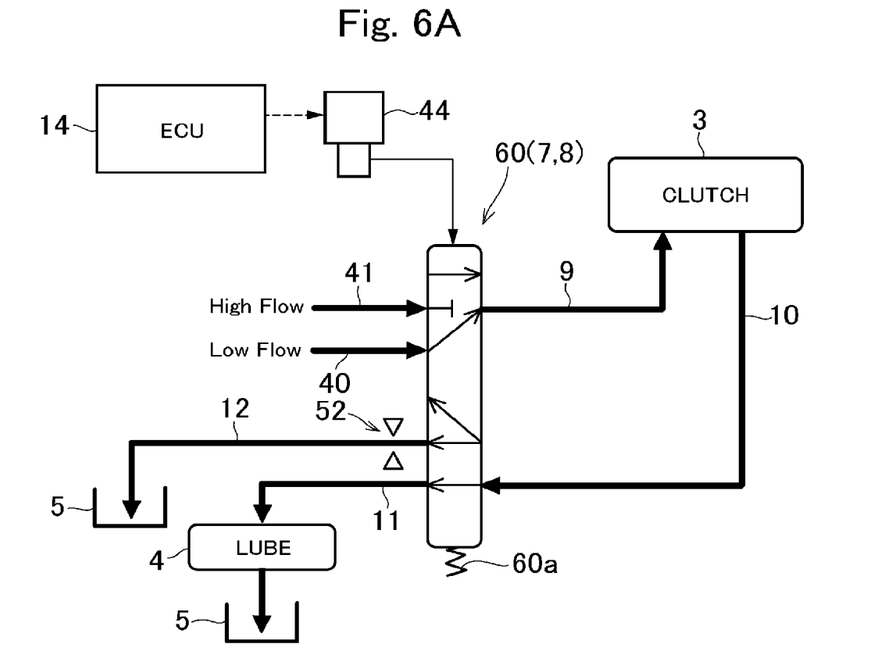
FIGS. 6A and 6B are partial diagram circuits showing another example of the lubrication system in which the first control valve and the second control valve are integrated to form the third control valve.
Figure 6B:
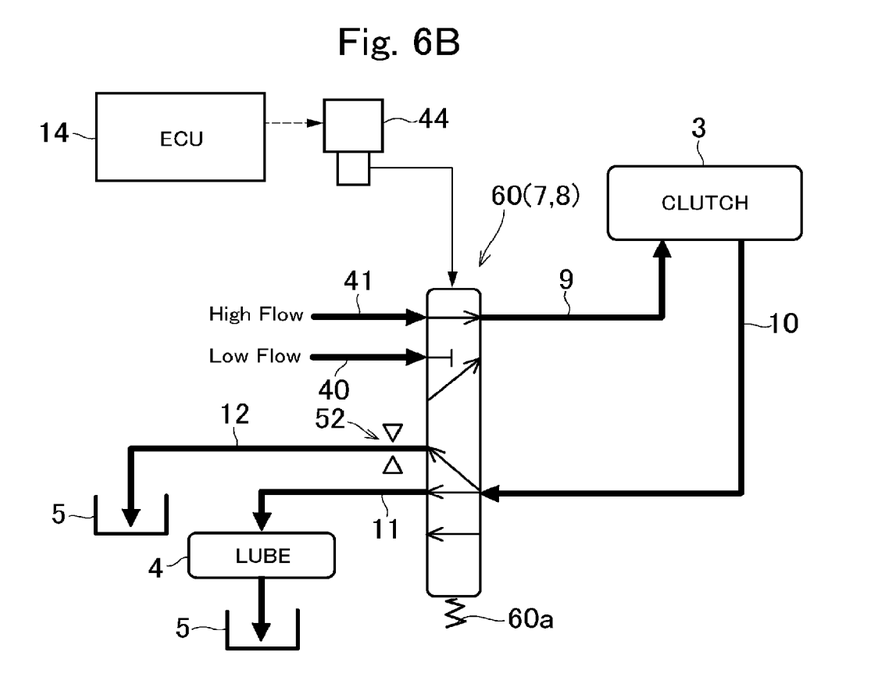

Turning to FIGS. 6A and 6B, there is shown another example of the lubrication system 1 to switch the flow rate of the oil by the procedures shown in FIG. 5. In FIGS. 6A and 6B, common reference numerals are allotted to the elements in common with the foregoing example.

In the lubrication system 1 shown in FIGS. 6A and 6B, the first control valve 7 and the second control valve 8 are integrated to form a third control valve 60. As the forgoing example, a changeover valve is adopted as the first control valve 7 and the second control valve 8, respectively.

As illustrated in FIG. 6A, when the third control valve 60 is brought into a low flow rate mode, the low flow rate passage 40 is connected to the first oil passage 9, and the second oil passage 10 is connected to the third oil passage 11. In this case, the fourth oil passage is not connected to any of the oil passages. Therefore, the oil is delivered to the starting clutch 3 at the low flow rate through the first oil passage 9, and further delivered to the lubrication site 4 at the constant rate through the third oil passage 11. That is, the oil is not drained directly to the oil pan 5. As illustrated in FIG. 6B, when the third control valve 60 is brought into a high flow rate mode, the high flow rate passage 41 is connected to the first oil passage 9, and the second oil passage 10 is connected to both of the third oil passage 11 and the fourth oil passage 12. Therefore, the oil is delivered to the starting clutch 3 at the high flow rate through the first oil passage 9. In this case, a part of the oil is further delivered to the lubrication site 4 at the constant rate through the third oil passage 11, and the remaining oil is drained directly to the oil pan 5 through the fourth oil passage 12.

The third control valve 60 is normally brought into the low flow rate mode by a return spring 60a when the solenoid valve 44 is turned off. Whereas, when the solenoid valve 44 is turned on, the third control valve 60 is brought into the high flow rate mode by a hydraulic command signal (or pressure) transmitted from the solenoid valve 44.

Thus, in the lubrication system 1 shown in FIGS. 6A and 6B, the third control valve 60 serves not only as the first control valve 7 but also as the second control valve 8. According to another example of the present disclosure, therefore, the routine shown in FIG. 5 may be executed easily by controlling only the third control valve 60. In addition, since number of valves is reduced, a manufacturing cost of the lubrication system 1 can be reduced.

Although the above exemplary embodiments of the present disclosure have been described, it will be understood by those skilled in the art that the present disclosure should not be limited to the described exemplary embodiments, and various changes and modifications can be made within the scope of the present disclosure.

What is claimed is:

1. A lubrication system for a power transmission unit that cools and lubricates a wet friction clutch and a lubrication site of the power transmission unit by oil, comprising:
    a first control valve that controls a flow rate of the oil delivered from the oil pan to the friction clutch;
    a first oil passage that delivers the oil to the friction clutch at a flow rate regulated by the first control valve;
    a second oil passage that allows the oil to be discharged from the friction clutch after lubricating and cooling the friction clutch;
    a second control valve that controls a flow rate of the oil discharged from the friction clutch through the second oil passage;

a third oil passage that delivers the oil flowing from the friction clutch through the second oil passage to the lubrication site;
a fourth oil passage that discharges the oil to the oil pan at a flow rate regulated by the second control valve; and
a controller that controls at least the first control valve and the second control valve,
wherein the controller is configured to
bring the first control valve into a low inflow rate mode in which the oil flows into the friction clutch at a low rate, and bring the second control valve into a low outflow rate mode in which the oil is discharged to the oil pan at a low rate or not discharged to the oil pan, when the friction clutch is completely engaged or disengaged, and
bring the first control valve into a high inflow rate mode in which the oil flows into the friction clutch at a high rate that is higher than the rate in the low inflow rate mode, and bring the second control valve into a high outflow rate mode in which the oil is discharged to the oil pan at a high rate that is higher than the rate in the low outflow rate mode, when the friction clutch is engaged while causing slipping.

2. The lubrication system for the power transmission unit as claimed in claim 1,
wherein the friction clutch comprises an inlet that allows the oil delivered from the first control valve to flow into the friction clutch, and an outlet that allows the oil to be discharged from the friction clutch, and
the friction clutch is maintained in an oil-sealed condition in which an inflow of the oil to the friction clutch through the inlet is substantially equal to an outflow of the oil from the friction clutch through the outlet.

3. The lubrication system for the power transmission unit as claimed in claim 2, further comprising:
a hydraulic circuit including
a low flow rate passage in which a flow rate of the oil flowing from the oil pan to the first control valve therethrough is regulated to the low rate, and
a high flow rate passage in which a flow rate of the oil flowing from the oil pan to the first control valve therethrough is regulated to the high rate,
wherein the first control valve includes a changeover valve that is selectively switched between the low inflow rate mode to connect the low flow rate passage to the first oil passage, and the high inflow rate mode to connect the high flow rate passage to the first oil passage,
the second control valve includes a changeover valve that is selectively switched between the low outflow rate mode to connect the second oil passage to the third oil passage, and the high outflow rate mode to connect the second oil passage to both of the third oil passage and the fourth oil passage, and
the controller is further configured to
bring the first control valve into the low inflow rate mode and the second control valve into the low outflow rate mode when the friction clutch is completely engaged or disengaged, and
bring the first control valve into the high inflow rate mode and the second control valve into the high outflow rate mode when the friction clutch is engaged while causing slipping.

4. The lubrication system for the power transmission unit as claimed in claim 3, further comprising:
a solenoid valve that is turned off to bring the first control valve into the low inflow rate mode and the second control valve into the low outflow rate mode, and that is turned on to bring the first control valve into the high inflow rate mode and the second control valve into the high outflow rate mode,
wherein the controller is further configured to
turn off the solenoid valve when the friction clutch is completely engaged or disengaged, and
turn on the solenoid valve when the friction clutch is engaged while causing slipping.

5. The lubrication system for the power transmission unit as claimed in claim 2, further comprising:
a hydraulic circuit including
a low flow rate passage in which a flow rate of the oil flowing from the oil pan to the first control valve therethrough is regulated to the low rate, and
a high flow rate passage in which a flow rate of the oil flowing from the oil pan to the first control valve therethrough is regulated to the high rate,
a third control valve that is formed by integrating the first control valve with the second control valve,
wherein the third control valve includes a changeover valve that is selectively switched between a low flow rate mode to connect the low flow rate passage to the first oil passage and to connect the second oil passage to the third oil passage, and a high flow rate mode to connect the high flow rate passage to the first oil passage and to connect the second oil passage to both of the third oil passage and the fourth oil passage, and
the controller is further configured to
bring the third control valve into the low flow rate mode when the friction clutch is completely engaged or disengaged, and
bring the third control valve into the high flow rate mode when the friction clutch is engaged while causing slipping.

6. The lubrication system for the power transmission unit as claimed in claim 1, further comprising:
a hydraulic circuit including
a low flow rate passage in which a flow rate of the oil flowing from the oil pan to the first control valve therethrough is regulated to the low rate, and
a high flow rate passage in which a flow rate of the oil flowing from the oil pan to the first control valve therethrough is regulated to the high rate,
wherein the first control valve includes a changeover valve that is selectively switched between the low inflow rate mode to connect the low flow rate passage to the first oil passage, and the high inflow rate mode to connect the high flow rate passage to the first oil passage,
the second control valve includes a changeover valve that is selectively switched between the low outflow rate mode to connect the second oil passage to the third oil passage, and the high outflow rate mode to connect the second oil passage to both of the third oil passage and the fourth oil passage, and
the controller is further configured to
bring the first control valve into the low inflow rate mode and the second control valve into the low outflow rate mode when the friction clutch is completely engaged or disengaged, and
bring the first control valve into the high inflow rate mode and the second control valve into the high outflow rate mode when the friction clutch is engaged while causing slipping.

7. The lubrication system for the power transmission unit as claimed in claim 6, further comprising:

a solenoid valve that is turned off to bring the first control valve into the low inflow rate mode and the second control valve into the low outflow rate mode, and that is turned on to bring the first control valve into the high inflow rate mode and the second control valve into the high outflow rate mode, wherein the controller is further configured to turn off the solenoid valve when the friction clutch is completely engaged or disengaged, and turn on the solenoid valve when the friction clutch is engaged while causing slipping.

8. The lubrication system for the power transmission unit as claimed in claim 1, further comprising:

a hydraulic circuit including a low flow rate passage in which a flow rate of the oil flowing from the oil pan to the first control valve therethrough is regulated to the low rate, and a high flow rate passage in which a flow rate of the oil flowing from the oil pan to the first control valve therethrough is regulated to the high rate, a third control valve that is formed by integrating the first control valve with the second control valve, wherein the third control valve includes a changeover valve that is selectively switched between a low flow rate mode to connect the low flow rate passage to the first oil passage and to connect the second oil passage to the third oil passage, and a high flow rate mode to connect the high flow rate passage to the first oil passage and to connect the second oil passage to both of the third oil passage and the fourth oil passage, and the controller is further configured to bring the third control valve into the low flow rate mode when the friction clutch is completely engaged or disengaged, and bring the third control valve into the high flow rate mode when the friction clutch is engaged while causing slipping.

* * * * *